(12) United States Patent
Herman

(10) Patent No.: US 11,092,970 B2
(45) Date of Patent: Aug. 17, 2021

(54) AUTONOMOUS VEHICLE SYSTEMS UTILIZING VEHICLE-TO-VEHICLE COMMUNICATION

(71) Applicant: Ford Global Technologies, LLC, Dearborn, MI (US)

(72) Inventor: David Michael Herman, Oak Park, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 280 days.

(21) Appl. No.: 16/270,547

(22) Filed: Feb. 7, 2019

(65) Prior Publication Data
US 2020/0257308 A1    Aug. 13, 2020

(51) Int. Cl.
*G05D 1/02* (2020.01)
*H04W 4/40* (2018.01)
(Continued)

(52) U.S. Cl.
CPC ......... *G05D 1/0276* (2013.01); *G05D 1/0061* (2013.01); *G05D 1/0214* (2013.01);
(Continued)

(58) Field of Classification Search
CPC .. G05D 1/0276; G05D 1/0214; G05D 1/0231; G05D 1/0257; G05D 1/0061;
(Continued)

(56) References Cited

U.S. PATENT DOCUMENTS 9,542,846 B2   1/2017  Zeng et al.
2010/0256852 A1* 10/2010  Mudalige ................. G08G 1/22
                                                      701/24
(Continued)

FOREIGN PATENT DOCUMENTS

JP         2007025782 A    2/2007
WO     WO 2018029101 A1   2/1918

OTHER PUBLICATIONS

Borojeni, Shadan Sadeghian et al., *Assisting Drivers with Ambient Take-Over Requests in Highly Automated Driving*, Oct. 2016, Michigan, 8 pages.
(Continued)

*Primary Examiner* — Peter D Nolan
*Assistant Examiner* — Ashley L Redhead, Jr.
(74) *Attorney, Agent, or Firm* — Frank Lollo; Eversheds Sutherland (US) LLP

(57) ABSTRACT

Method and apparatus are disclosed for autonomous vehicle systems utilizing vehicle-to-vehicle communication. An example vehicle includes a communication module configured to perform vehicle-to-vehicle (V2V) communication with an adjacent vehicle having an autonomous system. The example vehicle also includes a controller configured to monitor within the V2V communication for a request by the autonomous system for manual override and, upon identifying the request, determine a collision probability for the adjacent vehicle based at least on the V2V communication. The controller also is configured to compare the collision probability to a first threshold. The example vehicle also includes an autonomy unit to autonomously perform a defensive driving maneuver responsive to the controller determining that the collision probability is greater than the first threshold.

18 Claims, 6 Drawing Sheets

(51) Int. Cl.
H04W 4/80 (2018.01)
G05D 1/00 (2006.01)

(52) U.S. Cl.
CPC ......... *G05D 1/0231* (2013.01); *G05D 1/0255* (2013.01); *G05D 1/0257* (2013.01); *H04W 4/40* (2018.02); *H04W 4/80* (2018.02); *G05D 2201/0213* (2013.01)

(58) Field of Classification Search
CPC ........ G05D 1/0255; G05D 2201/0213; H04W 4/40; H04W 4/80; H04W 4/46; H04W 4/38; G08G 1/166
See application file for complete search history.

(56) References Cited

U.S. PATENT DOCUMENTS

| | | | | |
|---|---|---|---|---|
| 2016/0304123 | A1* | 10/2016 | Lewis | B62D 5/0478 |
| 2017/0072967 | A1 | 3/2017 | Fendt et al. | |
| 2017/0316684 | A1 | 11/2017 | Jammoussi et al. | |
| 2018/0096602 | A1 | 4/2018 | She et al. | |
| 2020/0026282 | A1* | 1/2020 | Choe | G05D 1/0278 |
| 2020/0283027 | A1* | 9/2020 | Okuyama | B60W 30/18163 |

OTHER PUBLICATIONS

Gold, Christian Günter et al., *Modeling of Take-Over Performance in Highly Automated Vehicle Guidance*, Technische Universität München, 2016, 187 pages.

Gold, Christian Günter et al., *Modeling Take-Over Performance in Level 3 Conditionally Automated Vehicles*, Accident Analysis and Prevention, 11 pages.

Happee, Riender et al., *Take-Over Performance in Evasive Manoeuvres*, Accident Analysis and Prevention, 2017, 12 pages.

Lockheed Martin, *Core System Requirements Specification (SyRS)*, U.S. Department of Transportation, Research and Innovative Technology Administration, Apr. 2011 (131 Pages).

Kumar, Ammu M. et al., *Review of Lane Detection and Tracking Algorithms in Advanced Driver Assistance System*, International Journal of Computer Science & Information Technology (IJCSIT) vol. 7, No. 4, Aug. 2015, 14 pages.

Melcher, Vivien et al., *Take-Over Requests for Automated Driving*, 2015. 7 pages.

Minderhoud, Michiel M. et al., *Extended Time-To-Collision Measures for Road Traffic Safety Assessment*, Accident Analysis and Prevention, 2001, 9 pages.

Peters, Steven C., *Stability Measurement of High-Speed Vehicles*, Vehicle System Dynamics vol. 47, No. 6, Jun. 2009. 20 pages.

Pfromm, Matthias et al., *Investigation of Take-Over Performance of Driving Tasks by the Driver due to System Failure of Semi-Automated and Assisted Driving*, Aug. 2015, 8 pages.

Rieveley, Robert, *The Effect of Direct Yaw Moment on Human Controlled Vehicle Systems*, 2010, 179 pages.

Satzoda, Ravi Kumar et al., *On Performance Evaluation Metrics for Lane Estimation*, 2014, 6 pages.

Vermeulen, Robin, *Interface Design for the Take Over of Automated Driving*, 114 pages.

Wang, Ze, *LaneNet: Real-Time Lane Detection Networks for Autonomous Driving*, 2018, 9 pages.

Moran, Peter, Robust Lane Tracking—Peter Moran's Blog, retrieved from http://petermoran.org/robust-lane-tracking/ on Jan. 18, 2019. 19 pages.

* cited by examiner

AUTONOMOUS VEHICLE SYSTEMS UTILIZING VEHICLE-TO-VEHICLE COMMUNICATION

TECHNICAL FIELD

The present disclosure generally relates to vehicle systems and, more specifically, to autonomous vehicle systems utilizing vehicle-to-vehicle communication.

BACKGROUND

Many vehicles include functions in which at least some motive functions are semi-autonomously controlled by the vehicle. For instance, some vehicles include adaptive cruise control features (e.g., adaptive cruise control features) in which the vehicle controls its acceleration and/or deceleration so that it remains a safe distance behind a leading vehicle. Further, some vehicles include lane-assist features in which the vehicle is configured to autonomously perform corrective measures to remain within a detected lane of a road upon detecting that the vehicle is drifting out of that lane. Typically, a vehicle with an autonomous or semi-autonomous system includes sensors that collect information of a surrounding environment of the vehicle. In such instances, the autonomous or semi-autonomous driving system performs motive functions (e.g., steering, accelerating, braking, etc.) based on the collected information.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for autonomous vehicle systems utilizing vehicle-to-vehicle communication. An example disclosed vehicle includes a communication module configured to perform vehicle-to-vehicle (V2V) communication with an adjacent vehicle having an autonomous system. The example disclosed vehicle also includes a controller configured to monitor within the V2V communication for a request by the autonomous system for manual override and, upon identifying the request, determine a collision probability for the adjacent vehicle based at least on the V2V communication. The controller also is configured to compare the collision probability to a first threshold. The example disclosed vehicle also includes an autonomy unit to autonomously perform a defensive driving maneuver responsive to the controller determining that the collision probability is greater than the first threshold.

In some examples, the controller is configured to determine the collision probability based on a time-to-collision and a takeover time for the adjacent vehicle. In such examples, the takeover time corresponds with a time duration between the request and a predicted manual takeover by a vehicle operator. In some such examples, the controller is configured to determine the time-to-collision based on at least one of a velocity, an acceleration, a direction-of-travel, a distance to an object, a required steering angle to avoid the object, and a steering angle rate-of-change of the adjacent vehicle. In some such examples, the controller is configured to determine the takeover time based on measured characteristics of at least one of the adjacent vehicle, the vehicle operator, and an environment. In some such examples, the autonomy unit is configured to initiate the defensive driving maneuver before the takeover time is complete.

In some examples, the controller is configured to determine the collision probability further based on infrastructure data collected by the communication module via vehicle-to-infrastructure (V2X) communication. Some examples further include range-detection sensors. In such examples, the controller is configured to determine the collision probability of the adjacent vehicle further based on the range-detection sensors.

In some examples, the communication module is configured to communicate via designated short-range communication (DSRC) or cellular vehicle-to-everything (C-V2X) communication. Some examples further include a second communication module configured to communicate with a remote server. In such examples, the controller is configured to determine the collision probability of the adjacent vehicle further based on data collected from the remote server.

In some examples, the controller is configured to emit an alert to request manual takeover responsive to determining that the collision probability is less than the first threshold and greater than a second threshold.

Another example disclosed vehicle includes a communication module configured to perform vehicle-to-vehicle (V2V) communication with an adjacent vehicle, range-detection sensors configured to detect lane markers, and a controller. The controller is configured to detect lane-marker locations via the range-detection sensors, localization (via GPS receiver and an inertial measurement unit (IMU)), and/or an HD-map. Further, the controller is configured to collect lane-marker locations via the V2V communication, determine a collision probability by comparing the detected lane-marker locations and the collected lane-marker locations, and compare the collision probability to a first threshold. The example disclosed vehicle also includes an autonomy unit to autonomously perform a defensive driving maneuver responsive to the controller determining that the collision probability is greater than the first threshold.

In some examples, the range-detection sensors include at least one of a camera, a radar sensor, a lidar sensor, and an ultrasonic sensor.

In some examples, the controller is configured to determine the collision probability further based on a time-to-collision or an extended time-to-collision of the adjacent vehicle. In some such examples, the controller is configured to determine the time-to-collision based on at least one of a velocity, an acceleration, a direction-of-travel, a distance to an object, a required steering angle to avoid the object, and a steering angle rate-of-change of the adjacent vehicle.

In some examples, the controller is configured to determine the collision probability further based on a takeover time that corresponds with a time duration between a request for manual takeover and a predicted manual takeover action by a vehicle operator. In some such examples, the controller is configured to determine the takeover time based on measured characteristics of at least one of the adjacent vehicle, the vehicle operator, and an environment.

In some examples, the controller is configured to emit an alert to request manual takeover responsive to determining that the collision probability is less than the first threshold and greater than a second threshold. In some such examples, the collision probability is less than the second threshold when the collected lane-marker locations are within a predefined margin-of-error of the detected lane-marker locations.

In some examples, the autonomy unit is configured to autonomously perform the defensive driving maneuver for an advanced driver-assistance system (ADAS) or a fully autonomous system. In some examples, the defensive driving maneuver performed by the autonomy unit includes at least one of decelerating, emergency braking, changing lanes, and changing a position within a current lane.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
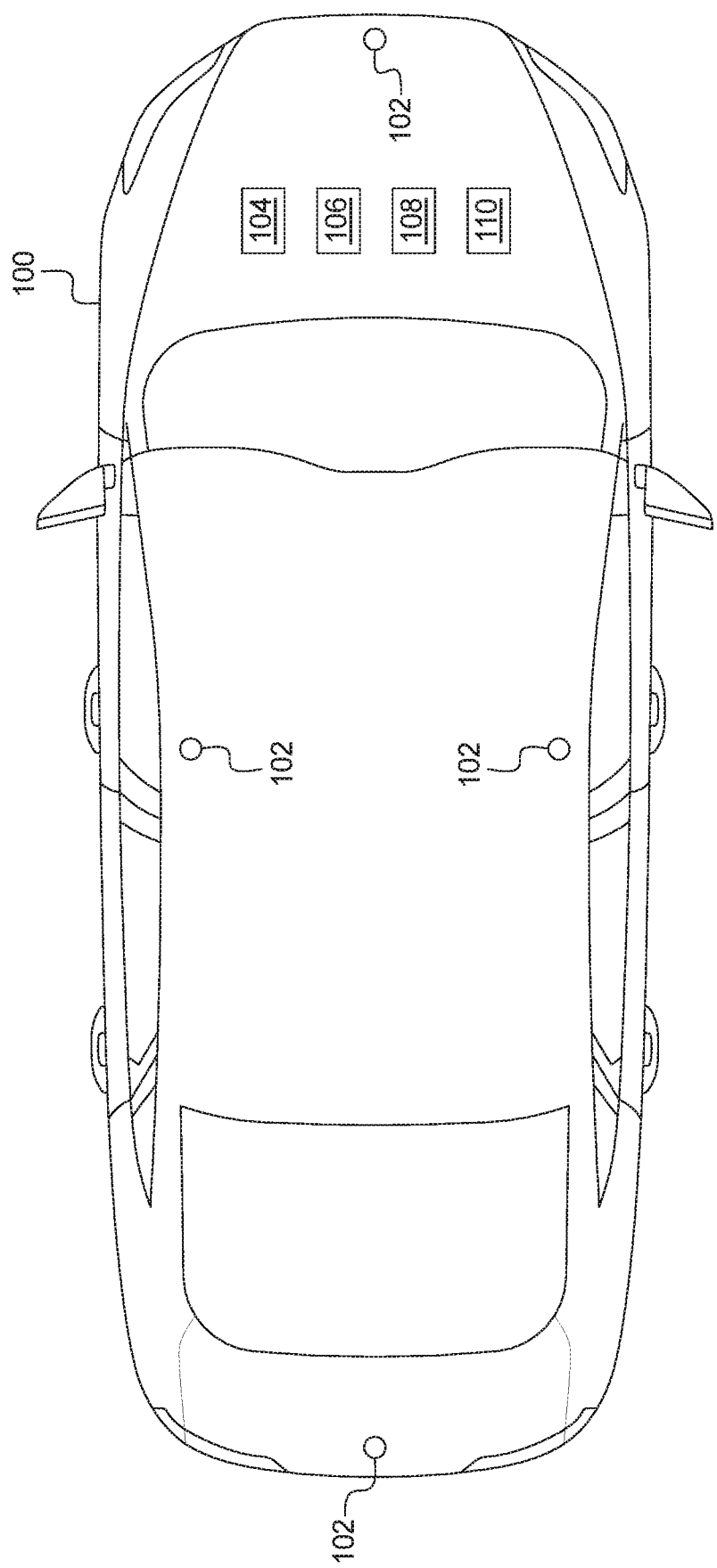
FIG. 1 illustrates an example vehicle in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Many vehicles include functions in which at least some motive functions are semi-autonomously controlled by the vehicle. For instance, some vehicles include adaptive cruise control features (e.g., adaptive cruise control features) in which the vehicle controls its acceleration and/or deceleration so that it remains a safe distance behind a leading vehicle. Further, some vehicles include lane-assist features in which the vehicle is configured to autonomously perform corrective measures to remain within a detected lane of a road upon detecting that the vehicle is drifting out of that lane. Typically, a vehicle with an autonomous or semi-autonomous system includes sensors that collect information of a surrounding environment of the vehicle. In such instances, the autonomous or semi-autonomous driving system performs motive functions (e.g., steering, accelerating, braking, etc.) based on the collected information.

In some instances, an autonomous or semi-autonomous system of a vehicle potentially may be unable to accurately detect a lane within which it is traveling and/or driving characteristics of an adjacent vehicle due to, for example, poor visibility, weather conditions, a lack of lidar sensor data, faded lane markers, repaving operations, construction conditions, etc. Oftentimes, such semi-autonomous vehicles are configured to enable an operator of the vehicle to manually take over control of the vehicle in such instances. This manual takeover may be prompted by the autonomous system of the vehicle or initiated independently by the operator of the vehicle. If the operator does not take over control in a timely manner, an accident may potentially result. Further, an accident may potentially occur if the operator overcompensates while taking over control from the autonomous feature.

Example methods and apparatus disclosed herein enable a semi-autonomous vehicle to autonomously perform a defensive driving maneuver and/or emit an alert for its operator to avoid a collision resulting from activities of an adjacent autonomous and/or semi-autonomous vehicle. Example vehicles disclosed herein are configured to (1) communicate with an adjacent autonomous and/or semi-autonomous vehicle via vehicle-to-vehicle (V2V) communication, (2) determine a collision probability for the adjacent vehicle based on the communication, and (3) autonomously perform a defensive driving maneuver and/or emit an alert for its operator in response to determining that the collision probability of the adjacent vehicle exceeds a threshold. For example, a host vehicle disclosed herein includes an advanced driver-assistance system (ADAS). Further, the host vehicle communicates with the adjacent vehicle via V2V communication. If the adjacent vehicle is an autonomous or semi-autonomous vehicle, a controller of the host vehicle is configured to monitor the (semi-)autonomous system(s) of the adjacent vehicle. For example, if an operator of the adjacent vehicle requests to manually override the (semi-) autonomous system(s) of the adjacent vehicle, the host vehicle performs autonomous maneuvers and/or emits an alert for its operator to manually take over control in response to (i) identifying a likelihood-of-collision of the secondary vehicle and (ii) determining that the likelihood-of-collision exceeds a threshold. Additionally or alternatively, if the controller of the host vehicle determines that the (semi-)autonomous system(s) of the adjacent vehicle is incorrectly detecting lane markers, the host vehicle is configured to perform autonomous maneuvers and/or emit an alert for its operator to manually take over control.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be semi-autonomous (e.g., some routine motive functions controlled by the vehicle 100) or autonomous (e.g., motive functions are controlled by the vehicle 100 without direct driver input). In the illustrated example, the vehicle 100 includes range-detection sensors 102, a communication module 104, a communication module 106, an autonomy unit 108, and an ambient controller 110.

The range-detection sensors 102 of the illustrated example are arranged on the vehicle 100 to monitor object(s) within a surrounding area of the vehicle 100. As used herein, a "range-detection sensor" refers to an electronic device that is configured to collect information to detect a presence of and distance to nearby object(s). In the illustrated example, the range-detection sensors 102 include proximity sensors and/or cameras. The proximity sensors are configured to detect the presence, proximity, and/or location of object(s) near the vehicle 100. For example, the proximity sensors include radar sensor(s), lidar sensor(s), ultrasonic sensor(s), and/or any other sensor configured to detect the presence, proximity, and/or location of nearby object(s). A radar sensor detects and locates an object via radio waves, a lidar sensor detects and locates the object via lasers, and an ultrasonic sensor detects and locates the object via ultrasound waves. Further, the cameras are configured to capture image(s) and/or video of a surrounding area of the vehicle 100 to enable nearby object(s) to be identified and located. In the illustrated example, the range-detection sensors 102 are located on each side of the vehicle 100 (e.g., front, rear, left, right) to enable the range-detection sensors 102 in monitoring each portion of the surrounding area of the vehicle 100. Additionally or alternatively, the range-detection sensors 102 may be positioned at other location(s) of the vehicle 100 that enable the range-detection sensors to monitor the surrounding area of the vehicle 100.

The communication module 104 is configured to communicate with other nearby communication devices. In the illustrated example, the communication module 104 includes a dedicated short-range communication (DSRC) module. A DSRC module includes antenna(s), radio(s) and software to communicate with nearby vehicle(s) via vehicle-to-vehicle (V2V) communication, infrastructure-based module(s) via vehicle-to-infrastructure (V2I) communication, and/more, more generally, nearby communication device(s) (e.g., a mobile device-based module) via vehicle-to-everything (V2X) communication.

More information on the DSRC network and how the network may communicate with vehicle hardware and software is available in the U.S. Department of Transportation's Core June 2011 System Requirements Specification (SyRS) report (available at http://wwwits.dot.gov/meetings/pdf/CoreSystemSESyRSRevA%20(2011-06-13).pdf), which is hereby incorporated by reference in its entirety along with all of the documents referenced on pages 11 to 14 of the SyRS report. DSRC systems may be installed on vehicles and along roadsides on infrastructure. DSRC systems incorporating infrastructure information is known as a "roadside" system. DSRC may be combined with other technologies, such as Global Position System (GPS), Visual Light Communications (VLC), Cellular Communications, and short range radar, facilitating the vehicles communicating their position, speed, heading, relative position to other objects and to exchange information with other vehicles or external computer systems. DSRC systems can be integrated with other systems such as mobile phones.

Currently, the DSRC network is identified under the DSRC abbreviation or name. However, other names are sometimes used, usually related to a Connected Vehicle program or the like. Most of these systems are either pure DSRC or a variation of the IEEE 802.11 wireless standard. However, besides the pure DSRC system it is also meant to cover dedicated wireless communication systems between cars and roadside infrastructure system, which are integrated with GPS and are based on an IEEE 802.11 protocol for wireless local area networks (such as, 802.11p, etc.).

Additionally or alternatively, the communication module 104 includes a cellular vehicle-to-everything (C-V2X) module. A C-V2X module include hardware and software to communicate with other vehicle(s) via V2V communication, infrastructure-based module(s) via V2I communication, and/or, more generally, nearby communication devices (e.g., mobile device-based modules) via V2X communication. For example, a C-V2X module is configured to communicate with nearby devices (e.g., vehicles, roadside units, mobile devices, etc.) directly and/or via cellular networks. Currently, standards related to C-V2X communication is being developed by the 3rd Generation Partnership Project.

Further, the communication module 106 is configured to communicate with external networks. For example, the communication module 106 includes hardware (e.g., processors, memory, storage, antenna, etc.) and software to control wired or wireless network interfaces. In the illustrated example, the communication module 106 includes one or more communication controllers for cellular networks (e.g., Global System for Mobile Communications (GSM), Universal Mobile Telecommunications System (UMTS), Long Term Evolution (LTE), Code Division Multiple Access (CDMA)), Near Field Communication (NFC) and/or other standards-based networks (e.g., WiMAX (IEEE 802.16m), local area wireless network (including IEEE 802.11 a/b/g/n/ac or others), Wireless Gigabit (IEEE 802.11ad), etc.). In some examples, the communication module 106 includes a wired or wireless interface (e.g., an auxiliary port, a Universal Serial Bus (USB) port, a Bluetooth® wireless node, etc.) to communicatively couple with a mobile device (e.g., a smart phone, a wearable, a smart watch, a tablet, etc.). In such examples, the vehicle 100 may communicate with the external network via the coupled mobile device. The external network(s) may be a public network, such as the Internet; a private network, such as an intranet; or combinations thereof, and may utilize a variety of networking protocols now available or later developed including, but not limited to, TCP/IP-based networking protocols.

The autonomy unit 108 of the illustrated example is configured to perform autonomous and/or semi-autonomous driving maneuvers, such as defensive driving maneuvers, for the vehicle 100. For example, the autonomy unit 108 performs the autonomous and/or semi-autonomous driving maneuvers based on data collected by the range-detection sensors 102. In some examples, the autonomy unit 108 configured to operate a fully autonomous system, a park-assist system, an advanced driver-assistance system (ADAS), and/or other autonomous system(s) for the vehicle 100.

As used herein, "vehicle park-assist" and "park-assist" refer to a system in which a vehicle controls its motive functions, without direct steering or velocity input from an operator (e.g., a driver), to autonomously park within a parking spot. For example, the autonomy unit 108 controls the motive functions for a park-assist system upon receiving an initiation signal from the operator.

An ADAS is configured to assist a driver in safely operating the vehicle 100. For example, the ADAS is configured to perform adaptive cruise control, collision avoidance, lane-assist (e.g., lane centering), blind-spot detection, rear-collision warning(s), lane departure warnings and/or any other function(s) that assist the driver in operating the vehicle 100. To perform the driver-assistance features, the ADAS monitors objects (e.g., vehicles, pedestrians, traffic signals, etc.) and develops situational awareness around the vehicle 100. For example, the ADAS utilizes data collected by the range-detection sensors 102, the communication module 104 (e.g., from other vehicles, from roadside units, etc.), the communication module 106 from a remote server, and/or other sources to monitor the nearby objects and develop situational awareness.

Further, in the illustrated example, the ambient controller 110 is configured to monitor an ambient environment of the vehicle 100. For example, to enable the autonomy unit 108 to perform autonomous and/or semi-autonomous driving maneuvers, the ambient controller 110 collects data that is collected by the range-detection sensors 102 of the vehicle 100. In some examples, the ambient controller 110 collects location-based data via the communication module 106 and/or another module (e.g., a GPS receiver) to facilitate the autonomy unit 108 in performing autonomous and/or semi-autonomous driving maneuvers. Additionally, the ambient controller 110 collects data from (i) adjacent vehicle(s) (e.g., a vehicle 202 of FIGS. 2A-3) via the communication module 104 and V2V communication and/or (ii) roadside unit(s) via the communication module 104 and V2I communication to further facilitate the autonomy unit 108 in performing autonomous and/or semi-autonomous driving maneuvers.

In operation, the communication module 104 performs V2V communication with an adjacent vehicle. For example, the communication module 104 collects data from the adjacent vehicle that identifies (i) whether the adjacent vehicle includes an autonomous and/or semi-autonomous system (e.g., ADAS), (ii) whether the autonomous and/or semi-autonomous system is active, (iii) whether a manual takeover request of the autonomous and/or semi-autonomous system has been issued, (iv) lane-detection information of the adjacent vehicle, (v) a speed and/or acceleration of the adjacent vehicle, (vi) a (relative) position of the adjacent vehicle, (vii) a direction-of-travel of the adjacent vehicle, (viii) a steering angle rate-of-change of the adjacent vehicle (ix) dimensions of the adjacent vehicle, (x) whether the adjacent vehicle is utilizing stability control system(s) (e.g., anti-lock braking, traction control, electronic stability control, etc.), and/or any other information that facilitates the ambient controller 110 in monitoring the adjacent vehicle.

Based at least partially on the data that the communication module 104 collects from the adjacent vehicle via V2V communication, the ambient controller 110 determines a collision probability for the adjacent vehicle. For example, the ambient controller 110 determines a collision probability for the adjacent vehicle in response to identifying a manual takeover request within the data collected by the communication module 104 from the adjacent vehicle. Additionally or alternatively, the ambient controller 110 determines a collision probability for the adjacent vehicle in response to identifying a discrepancy between (i) lane-marker locations determined by the ambient controller 110 of the vehicle 100 based on the range-detection sensors 102 and (ii) lane-marker location determined by the adjacent vehicle. Further, in some examples, the ambient controller 110 determines the collision probability for the adjacent vehicle based on data collected from other sources, such as the range-detection sensors 102 and/or other sensor(s) of the vehicle 100, roadside unit(s) in communication with the communication module 104 via V2I communication, and/or remote server(s) in communication with the communication module 106. For example, the ambient controller 110 determines the collision probability for the adjacent vehicle upon determining, based on data collected by the sensors of the vehicle 100 and the adjacent vehicle, that the adjacent vehicle has not detected a nearby object.

In some examples, the ambient controller 110 determines the collision probability based on a takeover time for the adjacent vehicle and/or a time-to-collision of the adjacent vehicle. For example, the takeover time corresponds with a duration of time between (1) the adjacent vehicle emitting a request for a manual takeover to be performed and (2) an operator of the adjacent vehicle manually taking over control of the adjacent vehicle. The ambient controller 110 is configured to determine the takeover time of the adjacent vehicle based on measured characteristics of the adjacent vehicle (e.g., velocity, acceleration, dimensions, etc.), the operator of the adjacent vehicle (e.g., a measured reaction time, etc.), and/or an environment of the adjacent vehicle (e.g., road conditions, weather conditions, etc.). Further, the time-to-collision corresponds with the time it would take for the adjacent vehicle to collide with another vehicle (e.g., a third vehicle) and/or object (e.g., a guiderail, a highway lane divider, etc.) if the current conditions were maintained. An example equation for calculating the time-to-collision is provided below:

$$TTC_i = \frac{X_{i-1}(t) - X_i(t) - l_i}{\dot{X}_i(t) - \dot{X}_{i-1}(t)} \qquad \text{Equation 1}$$

In Equation 1 provided above, X represents a vehicle speed, X represents a vehicle position, and 1 represents a vehicle length. Additionally or alternatively, the ambient controller 110 is configured to determine the time-to-collision of the adjacent vehicle based on a velocity, an acceleration, a direction-of-travel, a distance to the object, a required steering angle to avoid the object, a steering angle rate-of-change, and/or other measured characteristics of the adjacent vehicle that the communication module 104 collects from the adjacent vehicle via V2V communication. Further, the ambient controller 110 is configured to determine a collision probability for the vehicle 100 based on the collision probability of the adjacent vehicle.

Upon determining the collision probability of the adjacent vehicle, the ambient controller 110 compares the collision probability to one or more thresholds. For example, the ambient controller 110 compares the collision probability to a first threshold and a second threshold that is less than the first threshold. In response to the ambient controller 110 determining that the collision probability is greater than the first threshold, the autonomy unit 108 autonomously performs (e.g., for the ADAS) a defensive driving maneuver to prevent the vehicle 100 from being involved in a collision caused by the adjacent vehicle. For example, the autonomous defensive driving maneuver includes deceleration, emergency braking, changing of lanes, changing of position within a current lane of travel, etc. In some examples, the autonomy unit 108 is configured to initiate the defensive driving maneuver before the takeover time of the adjacent vehicle has been completed. That is, the ambient controller 110 is configured to cause the autonomy unit 108 to perform the defensive driving maneuver before the operator of the adjacent vehicle manually takes over control of the adjacent vehicle. Further, in some examples, the ambient controller 110 emits an audio, visual, haptic, and/or other alert (e.g., via an HMI unit 404 of FIG. 4) the operator of the vehicle 100 to request manual takeover in response to determining that the collision probability is less than the first threshold and greater than the second threshold. By emitting such an alert, the ambient controller 110 enables the operator of the vehicle 100 to safely takeover control of the vehicle 100 before the adjacent vehicle is potentially involved in a collision. Additionally or alternatively, the ambient controller 110 is configured to perform other defensive measures (e.g., prefilling brake fluid lines) in response to determining that the collision probability is greater than a threshold (e.g., the second threshold, a third threshold).

Figure 2A:
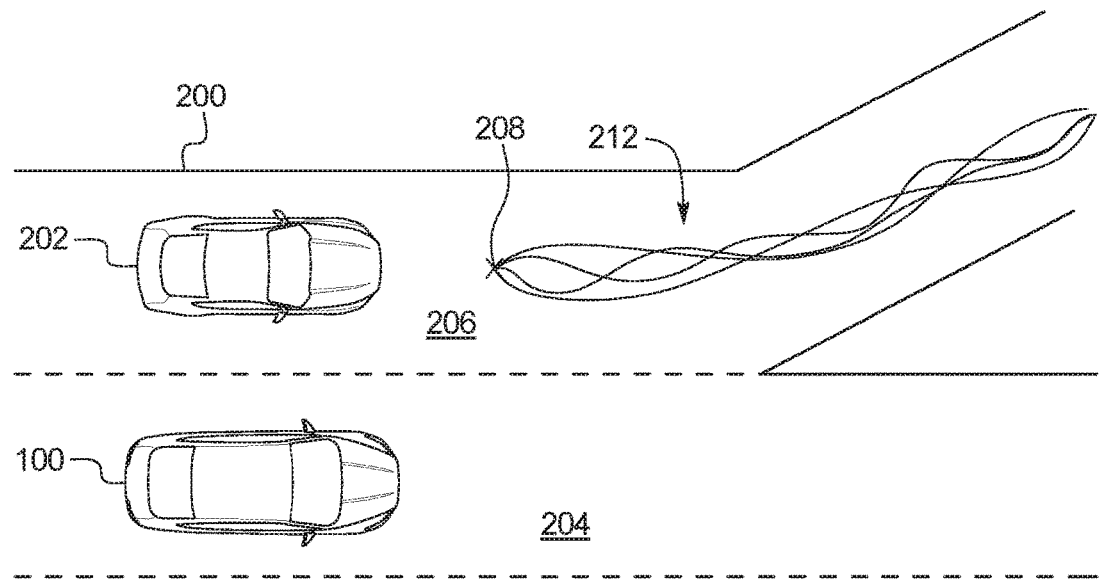
FIGS. 2A-2B depict an example environment in which an autonomous system of the vehicle of FIG. 1 utilizes vehicle-to-vehicle communication.
Figure 2B:
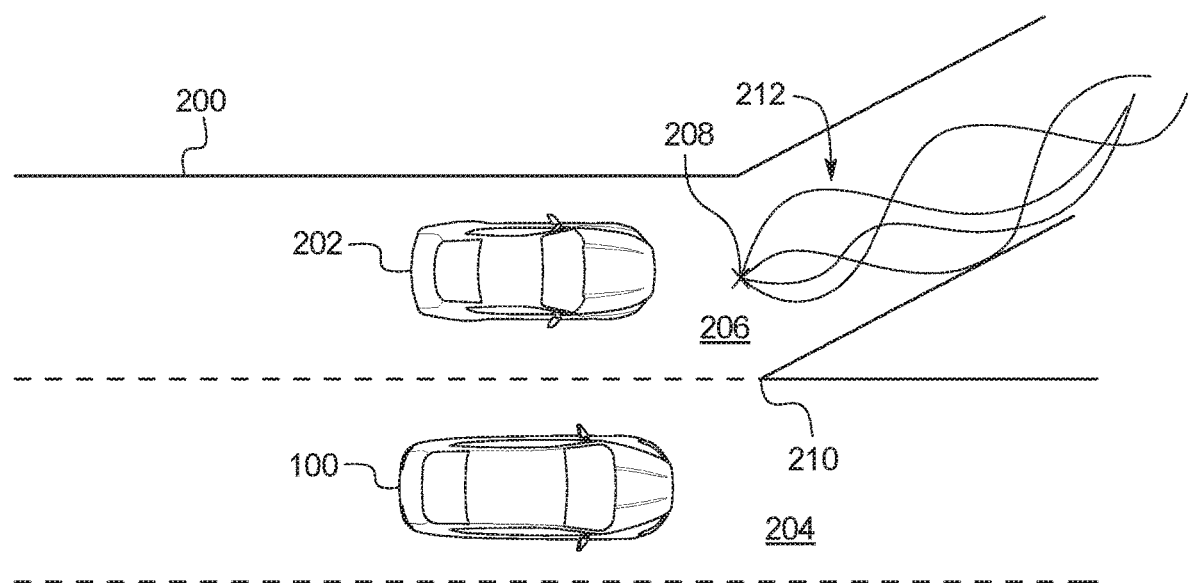

FIGS. 2A-2B depict an example environment in which an autonomous system of the vehicle 100 utilizes vehicle-to-vehicle communication. In FIGS. 2A-2B, the vehicle 100 is traveling along a road 200 adjacent to another vehicle 202.

For example, the road includes a lane 204 and another lane 206. In the illustrated example, the lane 206 transitions to an off-ramp. Further, in the illustrated example, the vehicle 100 is traveling within the lane 204 and the vehicle 202 is traveling within the lane 206 in a side-by-side manner.

In the illustrated example, the vehicle 100 is a semi-autonomous vehicle that is being operated by an operator. In other examples, the vehicle 100 is a fully autonomous vehicle. Further, the vehicle 202 that is operated by an operator. In the illustrated example, the vehicle 100 and the vehicle 202 are a different make and model. For example, the vehicle 100 is a model "Tau," and the vehicle 202 is a model "Sigma." In other examples, the vehicle 100 and the vehicle 202 may be the same make and/or model.

In operation, the communication module 104 of the vehicle 100 performs V2V communication with the vehicle 202 while the vehicles 100, 202 are traveling along the road 200. Based on the collected data, the ambient controller 110 of the vehicle 100 identifies (1) whether the vehicle 100 has an autonomous and/or other semi-autonomous system and (2) whether such a system is active. For example, in the illustrated example, the ambient controller 110 determines that the vehicle 202 has an autonomous system that is currently active. Further, the communication module 104 continues to collect data (e.g., continuously, periodically, etc.) while the vehicle 202 drives adjacent to the vehicle 100.

In the illustrated example, the autonomous system of the vehicle 202 is configured to emit a request for a manual takeover by its operator if the autonomous system detects a potential collision and/or is unsure as to whether there is a potential collision (e.g., due to poor visibility, weather conditions, a lack of lidar sensor data, construction conditions, etc.). The request may be in the form of an alert, such as an audio alert, a visual alert, a haptic alert, etc. Further, the vehicle 202 may or may not slow down while the alert is being emitted.

Further, the ambient controller 110 of the vehicle 100 identifies that the autonomous system of the vehicle 202 has emitted a manual takeover request based on the data collected via V2V communication by the communication module 104. Upon identifying that the autonomous system of the vehicle 202 emitted the manual takeover request, the ambient controller 110 of the vehicle 100 determines a collision probability for the vehicle 202. For example, the ambient controller 110 determines the collision probability for the vehicle 202 based on data collected from (1) the vehicle 202 via V2V communication, (2) roadside unit(s) via V2I communication, (3) other vehicle(s) via V2V communication, (4) the range-detection sensors 102 of the vehicle, (5) other sensor(s) of the vehicle 100, (6) a remote server, etc.

In the illustrated example, the ambient controller 110 determines the collision probability for the vehicle 202 based on a takeover time and/or a time-to-collision of the vehicle 202. For example, the takeover time corresponds with a duration of time between the takeover request being emitted and the operator taking over control of the vehicle 202. In FIGS. 2A-2B, the takeover time is reflected by the amount of time it takes for the vehicle 202 to travel from its current position to a takeover point 208. Further, the time-to-collision corresponds with the time it would take for the adjacent vehicle to collide with another vehicle (e.g., a third vehicle) and/or object (e.g., a guiderail) if the current conditions were maintained. For example, the time-to-collision decreases and a likelihood of a collision increases the closer the vehicle 202 is to an object. For example, as the vehicle 202 approaches a guiderail 210, it becomes more likely that one of a plurality of potential manual takeover paths 212 results in a collision for the vehicle 202.

In the illustrated example, upon determining the collision probability for the vehicle 202, the ambient controller 110 of the vehicle 100 compares the collision probability to one or more thresholds. For example, the ambient controller 110 compares the collision probability to a first threshold and a second threshold that is less than the first threshold. If the ambient controller 110 determines that the collision probability is less than the second threshold, no corresponding defensive function is performed. If the ambient controller 110 determines that the collision probability is less than the first threshold and greater than the second threshold, the ambient controller 110 emits a request for the operator to manual takeover control of the vehicle 100. For example, the request is the form of an audio signal, a visual signal, a haptic signal, etc. By emitting the request, the ambient controller 110 enables the operator of the vehicle 100 to safely takeover control of the vehicle 100 before the adjacent vehicle is potentially involved in a collision. FIG. 2A depicts a scenario for which the ambient controller 110 emits the manual takeover request. Further, if the ambient controller 110 determines that the collision probability is greater than the first threshold, the autonomy unit 108 of the vehicle 100 autonomously performs a defensive driving maneuver to protect the vehicle 100 from a potential collision caused by the vehicle 202. FIG. 2B depicts a scenario for which the autonomy unit 108 performs a defensive driving maneuver.

FIGS. 2A-2B depict the ambient controller 110 of the vehicle 100 monitoring the autonomous system of the vehicle 202 when the vehicle 202 is side-by-side the vehicle 100. Additionally, the ambient controller 110 of the vehicle 100 is configured to monitor the autonomous system of the vehicle 202 when the vehicle 100 is behind and/or located at any other adjacent position relative to the vehicle 202. For example, while the vehicle 100 is trailing the vehicle 202, the ambient controller 110 of the vehicle 100 is configured to (1) cause the autonomy unit 108 to perform a defensive driving maneuver and/or (2) emit an alert requesting manual takeover based upon its monitoring of the autonomous system of the vehicle 202.

Figure 3:
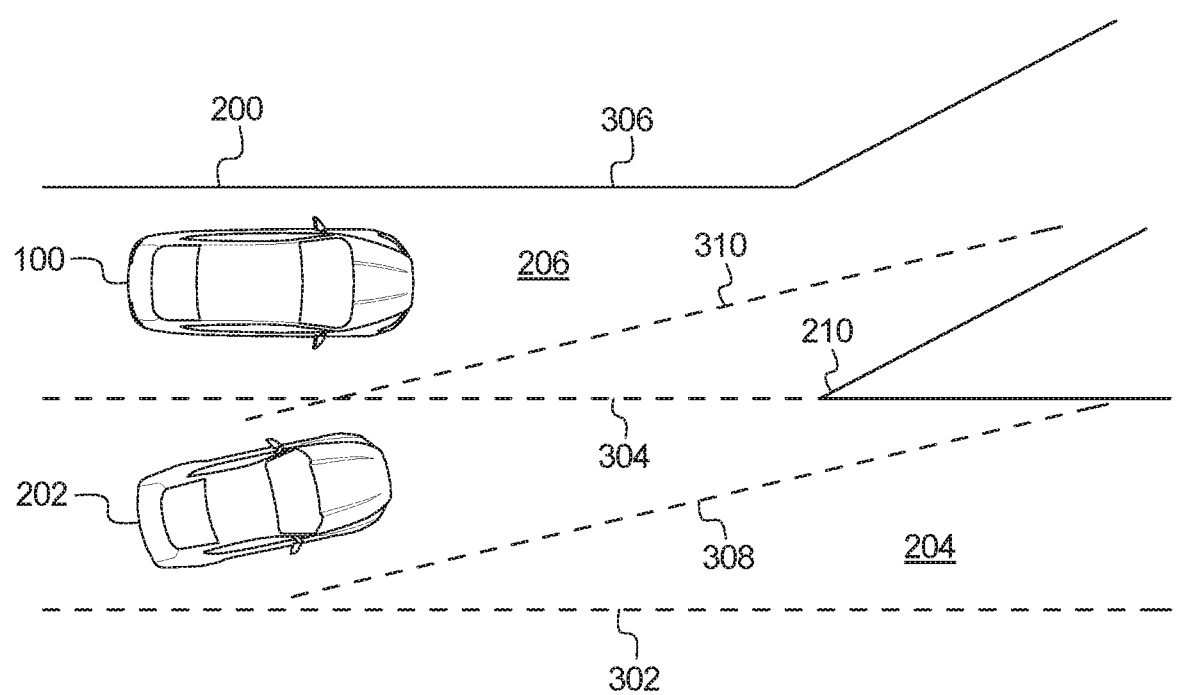
FIG. 3 depicts another example environment in which an autonomous system of the vehicle of FIG. 1 utilizes vehicle-to-vehicle communication.

FIG. 3 depicts another example environment in which an autonomous system of the vehicle 100 utilizes vehicle-to-vehicle communication. As illustrated in FIG. 3, the vehicle 100 and the vehicle 202 are travelling along the road 200. More specifically, the vehicle 100 is travelling within the lane 206, and the vehicle 202 is travelling within the lane 204. The lane 204 is defined by lane markers 302 and lane markers 304, and the lane 206 is defined by the lane markers 304 and lane markers 306.

In operation, the ambient controller 110 of the vehicle 100 detects lane-marker locations based on data collected by the range-detection sensors 102. In the illustrated example, the detected lane-marker locations match (e.g., are within a predefined margin of error of) the actual locations of the lane markers 302, 304, 306. Further, the autonomous system of the vehicle 202 predicts lane-marker locations (e.g., based on range-detection sensors of the vehicle 202). The communication module 104 of the vehicle 100 performs V2V communication with the vehicle 202 to collect the lane-marker locations as identified by the autonomous system of the vehicle 202. In the illustrated example, the collected lane-marker locations are represented by items 308 and 310, and the detected lane-marker locations match the actual locations of the lane markers 302, 304, 306.

Further, the ambient controller 110 of the vehicle 100 determines a collision probability for the vehicle 202 based on a comparison of the detected lane-marker locations and the collected lane-marker locations. For example, if the collected lane-marker locations 308, 310 match the detected lane-marker locations, the ambient controller 110 determines that the range-detections sensors and autonomous system of the vehicle 202 are operating properly and, thus, determines a low collision probability for the vehicle 202. In contrast, if the collected lane-marker locations 308, 310 are significantly different than the detected lane-marker locations, the ambient controller 110 determines that the range-detections sensors and/or the autonomous system of the vehicle 202 are not operating properly and, thus, determines a high collision probability for the vehicle 202. In some examples, the ambient controller 110 further determines the collision probability for the vehicle 202 based on a takeover time and/or a time-to-collision of the vehicle 202. Additionally or alternatively, the ambient controller 110 further determines the collision probability for the vehicle 202 based on a risk of overcompensation by the operator of the vehicle 202 while manually taking over control from the autonomous system of the vehicle 202.

In the illustrated example, upon determining the collision probability for the vehicle 202, the ambient controller 110 of the vehicle 100 compares the collision probability to one or more thresholds. For example, the ambient controller 110 compares the collision probability to a first threshold and a second threshold that is less than the first threshold. If the ambient controller 110 determines that the collision probability is less than the second threshold, no corresponding defensive function is performed. For example, the collision probability of the vehicle 202 is less than the second threshold when the collected lane-marker locations 308, 310 are within a predefined margin-of-error of the detected lane-marker locations. Further, if the ambient controller 110 determines that the collision probability is less than the first threshold and greater than the second threshold, the ambient controller 110 emits a request for the operator to manual takeover control of the vehicle 100. Further, if the ambient controller 110 determines that the collision probability is greater than the first threshold, the autonomy unit 108 of the vehicle 100 autonomously performs a defensive driving maneuver to protect the vehicle 100 from a potential collision caused by the vehicle 202. FIG. 3 depicts a scenario for which the autonomy unit 108 performs a defensive driving maneuver.

Further, in some examples, the ambient controller 110 may temporarily deactivate the comparison of lane-marker locations if such comparisons repeatedly reflect a significant difference between the detected lane-marker locations and lane-marker locations collected from multiple vehicles. In such instances, one or more of the range-detection sensors 102 of the vehicle 100 may be in need of replacement and/or maintenance. Additionally or alternatively, the ambient controller 110 may utilize other metrics, such as temporal stability and/or comparison to an HD-map, for determining whether one or more of the range-detection sensors 102 of the vehicle 100 may be in need of replacement and/or maintenance.

FIG. 3 depicts the ambient controller 110 of the vehicle 100 monitoring the autonomous system of the vehicle 202 when the vehicle 202 is side-by-side the vehicle 100. Additionally, the ambient controller 110 of the vehicle 100 is configured to monitor the autonomous system of the vehicle 202 when the vehicle 100 is behind and/or located at any other adjacent position relative to the vehicle 202. For example, while the vehicle 100 is trailing the vehicle 202, the ambient controller 110 of the vehicle 100 is configured to (1) cause the autonomy unit 108 to perform a defensive driving maneuver and/or (2) emit an alert requesting manual takeover based upon the lane-marker locations as detected by the vehicle 202.

Figure 4:
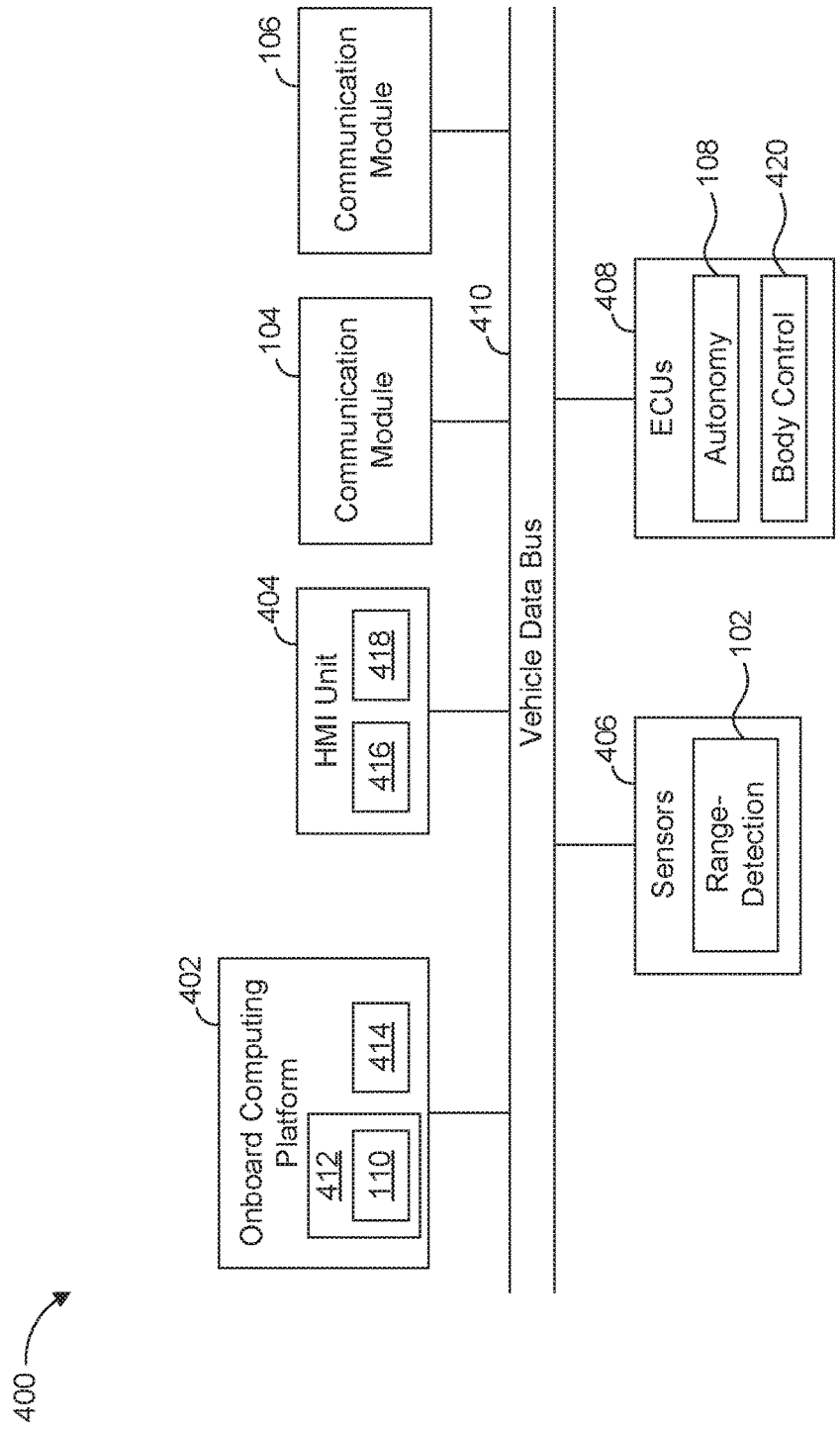
FIG. 4 is a block diagram of electronic components of the vehicle of FIG. 1.

FIG. 4 is a block diagram of electronic components 400 of the vehicle 100. In the illustrated example, the electronic components 400 include an onboard computing platform 402, a human-machine interface (HMI) unit 404, the communication module 104, the communication module 106, sensors 406, electronic control units (ECUs) 408, and a vehicle data bus 410.

The onboard computing platform 402 includes a processor 412 (also referred to as a microcontroller unit and a controller) and memory 414. In the illustrated example, the processor 412 of the onboard computing platform 402 is structured to include the ambient controller 110. In other examples, the ambient controller 110 is incorporated into another ECU with its own processor and memory. The processor 412 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 414 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 414 includes multiple kinds of memory, particularly volatile memory and non-volatile memory.

The memory 414 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 414, the computer readable medium, and/or within the processor 412 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The HMI unit 404 provides an interface between the vehicle 100 and a user. The HMI unit 404 includes digital and/or analog interfaces (e.g., input devices and output devices) to receive input from and display information for the user(s). The input devices include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), haptic devices, actuators, a display 416 (e.g., a heads-up display, a center console display such as a liquid crystal display (LCD), an organic light emitting diode (OLED) display, a flat panel display, a solid state display, etc.), and/or a speaker 418. For example, the display 416, the speaker 418, and/or other output device(s) of the HMI unit 404 are configured to emit an alert, such as an alert to request manual takeover, to an operator (e.g., a driver) of the vehicle 100. Further, the HMI unit 404 of the illustrated example includes hardware (e.g., a processor or controller, memory, storage, etc.) and software (e.g., an operating system, etc.) for an infotainment system (such as SYNC® and MyFord Touch® by Ford®) that is presented via the display 416.

The sensors 406 are arranged in and/or around the vehicle 100 to monitor properties of the vehicle 100 and/or an environment in which the vehicle 100 is located. One or more of the sensors 406 may be mounted to measure properties around an exterior of the vehicle 100. Additionally or alternatively, one or more of the sensors 406 may be mounted inside a cabin of the vehicle 100 or in a body of the vehicle 100 (e.g., an engine compartment, wheel wells, etc.) to measure properties in an interior of the vehicle 100. For example, the sensors 406 include accelerometers, odometers, tachometers, pitch and yaw sensors, wheel speed sensors, microphones, tire pressure sensors, biometric sensors and/or sensors of any other suitable type. In the illustrated example, the sensors 406 include the range-detection sensors 406 that are configured to monitor object(s) located within a surrounding area of the vehicle 100.

The ECUs 408 monitor and control the subsystems of the vehicle 100. For example, the ECUs 408 are discrete sets of electronics that include their own circuit(s) (e.g., integrated circuits, microprocessors, memory, storage, etc.) and firmware, sensors, actuators, and/or mounting hardware. The ECUs 408 communicate and exchange information via a vehicle data bus (e.g., the vehicle data bus 410). Additionally, the ECUs 408 may communicate properties (e.g., status of the ECUs 408, sensor readings, control state, error and diagnostic codes, etc.) to and/or receive requests from each other. For example, the vehicle 100 may have dozens of the ECUs 408 that are positioned in various locations around the vehicle 100 and are communicatively coupled by the vehicle data bus 410.

In the illustrated example, the ECUs 408 include the autonomy unit 108 and a body control module 420. For example, the autonomy unit 108 is configured to perform autonomous and/or semi-autonomous driving maneuvers (e.g., defensive driving maneuvers) of the vehicle 100 based upon, at least in part, instructions received from the ambient controller 110 and/or data collected by the range-detection sensors 102. Further, the body control module 420 controls one or more subsystems throughout the vehicle 100, such as power windows, power locks, an immobilizer system, power mirrors, etc. For example, the body control module 420 includes circuits that drive one or more of relays (e.g., to control wiper fluid, etc.), brushed direct current (DC) motors (e.g., to control power seats, power locks, power windows, wipers, etc.), stepper motors, LEDs, safety systems (e.g., seatbelt pretensioner, airbags, etc.), etc.

The vehicle data bus 410 communicatively couples the communication module 104, the communication module 106, the onboard computing platform 402, the HMI unit 404, the sensors 406, and the ECUs 408. In some examples, the vehicle data bus 410 includes one or more data buses. The vehicle data bus 410 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 5A:
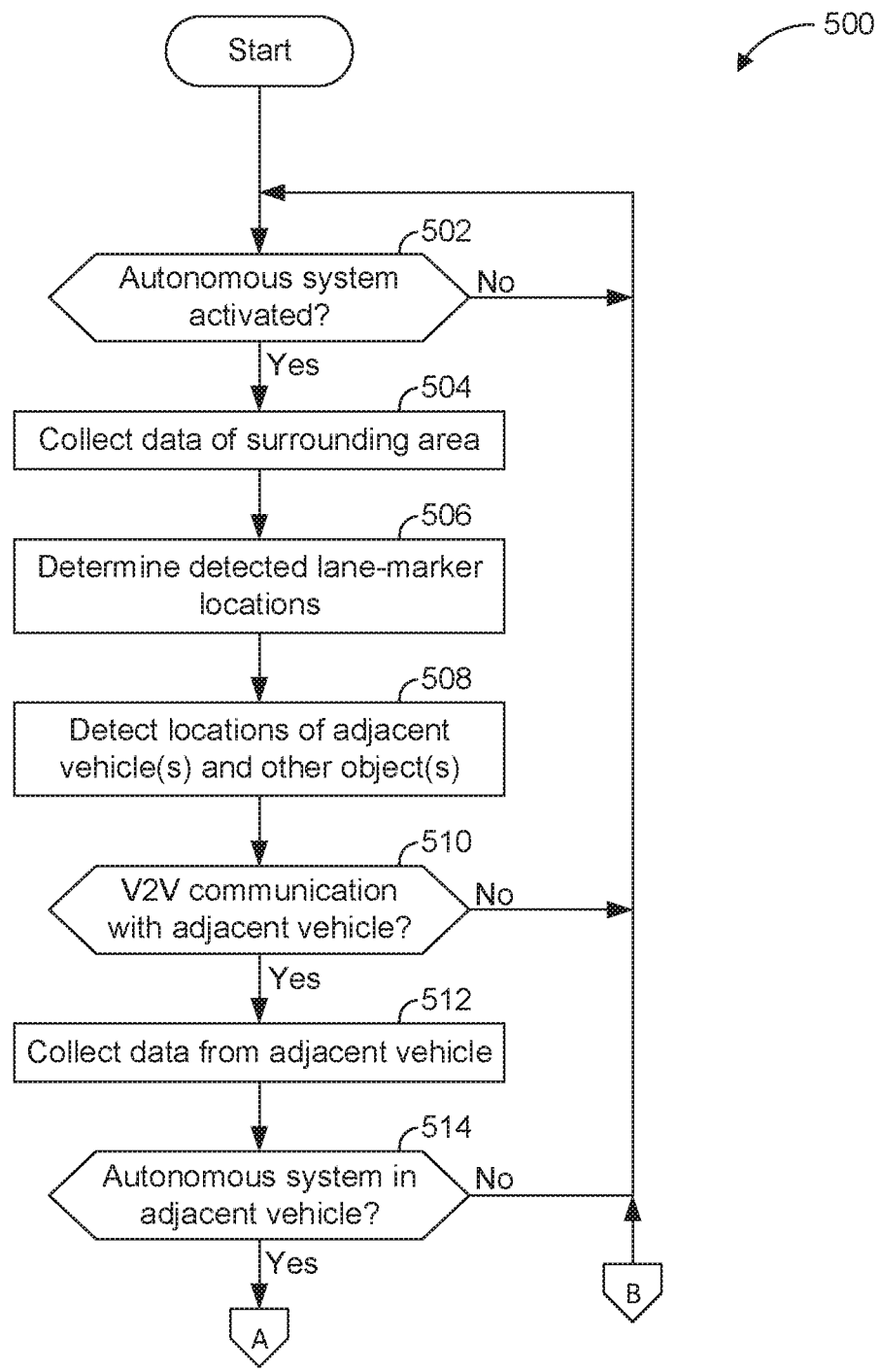
FIGS. 5A-5B is a flowchart for utilizing vehicle-to-vehicle communication for an autonomous system of a vehicle in accordance with the teachings herein.
Figure 5B:
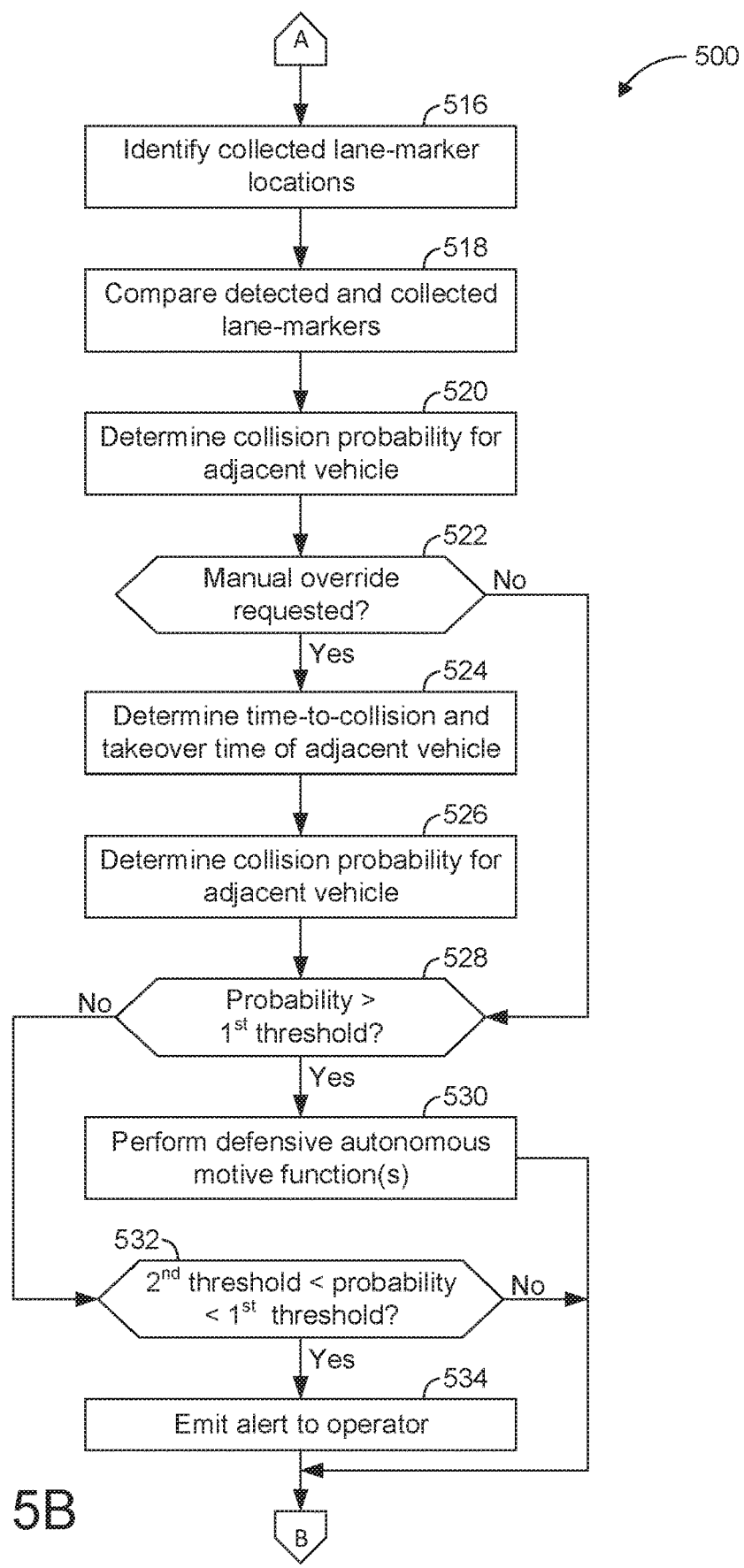

FIGS. 5A-5B is a flowchart of an example method 500 to utilize vehicle-to-vehicle communication for an autonomous system of a vehicle. The flowchart of FIGS. 5A-5B is representative of machine readable instructions that are stored in memory (such as the memory 414 of FIG. 4) and include one or more programs which, when executed by a processor (such as the processor 412 of FIG. 4), cause the vehicle 100 to implement the example ambient controller 110 of FIGS. 1 and 4. While the example program is described with reference to the flowchart illustrated in FIGS. 5A-5B, many other methods of implementing the example ambient controller 110 may alternatively be used. For example, the order of execution of the blocks may be rearranged, changed, eliminated, and/or combined to perform the method 500. Further, because the method 500 is disclosed in connection with the components of FIGS. 1-4, some functions of those components will not be described in detail below.

Initially, at block 502 of FIG. 5A, the ambient controller 110 determines whether an autonomous system of the vehicle 100 (e.g., a fully autonomous system, ADAS, etc.) is activated. In response to the ambient controller 110 determining that an autonomous system is not active, the method 500 remains at 502. Otherwise, in response to the ambient controller 110 determining that an autonomous system is active, the method 500 proceeds to block 504 at which the ambient controller 110 collects data of a surrounding area of the vehicle 100. For example, the ambient controller 110 collects the data from (i) the range-detection sensors 102; (ii) other sensor(s) of the vehicle 100; (iii) roadside unit(s) via the communication module 104; (iv) remote server(s) via the communication module 106; etc.

At block 506, the ambient controller 110 determines the detected lane-marker locations based on data collected by the range-detection sensors 102. At block 508, the ambient controller 110 identifies and detects location(s) of vehicle(s) (e.g., the vehicle 202 of FIGS. 2A-3) and/or other object(s) adjacent to the vehicle 100. For example, the ambient controller 110 detect(s) the vehicle(s) and/or other object(s) based on data collected from (i) the range-detection sensors 102; (ii) other sensor(s) of the vehicle 100; (iii) roadside unit(s) via the communication module 104; (iv) remote server(s) via the communication module 106; (v) a high definition (HD) map, etc. In some examples, the ambient controller 110 utilizes sensor fusion and/or outlier detection to facilitate analysis of data collected from multiple sources. Additionally or alternatively, the ambient controller 110 utilizes a filter (e.g., a Kalman filter, a particle filter, etc.) to analyze the data collected from the multiple sources.

At block 510, the ambient controller 110 determines whether the communication module 104 of the vehicle 100 is in V2V communication with an adjacent vehicle. For example, the ambient controller 110 determines whether the communication module 104 is communicating with the vehicle 202 via V2V communication. In response to the ambient controller 110 determining that the communication module 104 is not in V2V communication with an adjacent vehicle, the method 500 returns to block 502. Otherwise, in response to the ambient controller 110 determining that the communication module 104 is in V2V communication with an adjacent vehicle, the method 500 proceeds to block 512 at which the ambient controller 110 collects data from the adjacent vehicle via the communication module 104 and V2V communication.

At block 514, the ambient controller 110 determines whether an autonomous system (e.g., a fully autonomous system, ADAS) of the vehicle 202 that is adjacent to and in V2V communication with the vehicle 100 is active. For example, the ambient controller 110 determines (i) whether the vehicle 202 has an autonomous system and (ii) a status of an autonomous system of the vehicle 202 based on the data collected from the vehicle 202 by the communication module 104 via V2V communication. In response to the ambient controller 110 determining that the vehicle 202 does not have an active autonomous system, the method 500 returns to block 502. Otherwise, in response to the ambient controller 110 determining that the vehicle 202 has an active autonomous system, the method 500 proceeds to block 516.

At block 516, the ambient controller 110 identifies the collected lane-marker locations 308, 310 based on the data collected from the vehicle 202 by the communication module 104 via V2V communication. For example, the vehicle 202 includes (i) range-detection sensors that collect data, (ii) a processor that determine the collected lane-marker locations 308, 310 based on the collected data, and (iii) a communication module that sends the collected lane-marker locations 308, 310 and other collected data to the communication module 104 of the vehicle 100 via V2V communication.

At block 518, the ambient controller 110 compares the detected lane-marker locations and the collected lane-marker locations 308, 310. At block 520, the ambient controller 110 determines a collision probability for the vehicle 202 based on the comparison of block 518. For example, greater differences between the detected lane-marker locations and the collected lane-marker locations 308, 310 correspond with greater collision probabilities, and lesser differences between the detected lane-marker locations and the collected lane-marker locations 308, 310 correspond with lesser collision probabilities. In some examples, the ambient controller 110 determines the collision probability for the vehicle 202 further based on a time-to-collision, a takeover time, and/or a likelihood of overcompensation of the operator during manual takeover. Further, the ambient controller 110 is to determine a collision probability for the vehicle 100 based on the collision probability of the vehicle 202.

At block 522, the ambient controller 110 determines whether the processor of the vehicle 202 has requested a vehicle operator to manually override an autonomous system of the vehicle 202. For example, the ambient controller 110 emits a manual override request of the vehicle 100 based on data collected by the communication module 104 via V2V communication (e.g., for a level 4 or level 5 autonomous vehicle). In response to the ambient controller 110 not identifying a manual override of an autonomous system of the vehicle 202, the method 500 proceeds to block 528. Otherwise, in response to the ambient controller 110 identifying a manual override of an autonomous system of the vehicle 202, the method 500 proceeds to block 524.

At block 524, the ambient controller 110 determines a time-to-collision, a takeover time, and/or a likelihood of overcompensation of the operator during manual takeover for the vehicle 202. For example, the ambient controller 110 determines the time-to-collision, the takeover time of the vehicle 202 based on data collected by (i) the sensors 406 of the vehicle 100, (ii) the communication module 104 via V2V communication with the vehicle 202 and/or other vehicle(s), (iii) the communication module 104 via V2I communication with roadside unit(s), and/or (ii) the communication module 106 from communication with remote server(s). At block 526, the ambient controller 110 determines a collision probability for the vehicle 202 based on the time-to-collision, the takeover time, and/or a likelihood of overcompensation during manual takeover. Further, the ambient controller 110 is to determine a collision probability for the vehicle 100 based on the collision probability of the vehicle 202.

In some examples, a collision probability is determined both at block 520 and 526. In some such examples, blocks 528, 530, 532, 534 are performed for both of the determined collision probabilities. In other such examples, blocks 528, 530, 532, 534 are performed based on only the greater of the determined collision probabilities. Further, in other such examples, a modified collision probability is identified based on both of the determined collision probabilities and blocks 528, 530, 532, 534 are performed based on the modified collision probability.

At block 528, the ambient controller 110 determines whether the collision probability is greater than a first predetermined threshold. In response to the ambient controller 110 determining that the collision probability is greater than the first predetermined threshold, the method 500 proceeds to block 530 at which the autonomy unit 108 performs an autonomous defensive motive function. Upon completing block 530, the method 500 returns to block 502. Otherwise, in response to the ambient controller 110 determining that the collision probability is not greater than the first predetermined threshold, the method 500 proceeds to block 532. Additionally or alternatively, the ambient controller 110 determines whether to perform a defensive autonomous driving maneuver based on a comparison of the collision probability of the vehicle 100 to the first threshold.

At block 532, the ambient controller 110 determines whether the collision probability is greater than a second predetermined threshold and less than the first predetermined threshold. In response to the ambient controller 110 determining that the collision probability is not between the second and first predetermined thresholds, the method 500 returns to block 502. Otherwise, in response to the ambient controller 110 determining that the collision probability is between the second and first predetermined thresholds, the method 500 proceeds to block 534 at which the ambient controller 110 emits an alert to a vehicle operator of the vehicle 100 (e.g., to manually override an ADAS of the vehicle 100). Additionally or alternatively, the ambient controller 110 determines whether to emit an alert based on a comparison of the collision probability of the vehicle 100 to the second threshold. Upon completing block 534, the method 500 returns to block 502.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module" and "unit" refer to hardware with circuitry to provide communication, control and/or monitoring capabilities. A "module" and a "unit" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
    a communication module configured to perform vehicle-to-vehicle (V2V) communication with an adjacent vehicle having an autonomous system;
    a controller configured to:
        monitor within the V2V communication for a request by the autonomous system for manual override;
        upon identifying the request, determine a collision probability for the adjacent vehicle based at least on the V2V communication based on a time-to-collision and a takeover time for the adjacent vehicle, wherein the takeover time corresponds with a time duration between the request and a predicted manual takeover by a vehicle operator; and
        compare the collision probability to a first threshold; and
    an autonomy unit to autonomously perform a defensive driving maneuver responsive to the controller determining that the collision probability is greater than the first threshold.

2. The vehicle of claim 1, wherein the controller is configured to determine the time-to-collision based on at least one of a velocity, an acceleration, a direction-of-travel, a distance to an object, a required steering angle to avoid the object, and a steering angle rate-of-change of the adjacent vehicle.

3. The vehicle of claim 1, wherein the controller is configured to determine the takeover time based on measured characteristics of at least one of the adjacent vehicle, the vehicle operator, and an environment.

4. The vehicle of claim 1, wherein the autonomy unit is configured to initiate the defensive driving maneuver before the takeover time is complete.

5. The vehicle of claim 1, wherein the controller is configured to determine the collision probability further based on infrastructure data collected by the communication module via vehicle-to-infrastructure (V2I) communication.

6. The vehicle of claim 1, further including range-detection sensors, wherein the controller is configured to determine the collision probability of the adjacent vehicle further based on the range-detection sensors.

7. The vehicle of claim 1, wherein the communication module is configured to communicate via designated short-range communication (DSRC).

8. The vehicle of claim 1, further including a second communication module configured to communicate with a remote server, wherein the controller is configured to determine the collision probability of the adjacent vehicle further based on data collected from the remote server.

9. The vehicle of claim 1, wherein the controller is configured to emit an alert to request manual takeover responsive to determining that the collision probability is less than the first threshold and greater than a second threshold.

10. A vehicle comprising:
    a communication module configured to perform vehicle-to-vehicle (V2V) communication with an adjacent vehicle;
    range-detection sensors configured to detect lane markers;
    a controller configured to:
        detect lane-marker locations via the range-detection sensors;
        collect lane-marker locations via the V2V communication;
        determine a collision probability by comparing the detected lane-marker locations and the collected lane-marker locations; and
        compare the collision probability to a first threshold; and
    an autonomy unit to autonomously perform a defensive driving maneuver responsive to the controller determining that the collision probability is greater than the first threshold,
    wherein the controller is configured to emit an alert to request manual takeover responsive to determining that the collision probability is less than the first threshold and greater than a second threshold, and
    wherein the collision probability is less than the second threshold when the collected lane-marker locations are within a predefined margin-of-error of the detected lane-marker locations.

11. The vehicle of claim 10, wherein the range-detection sensors include at least one of a camera, a radar sensor, a lidar sensor, and an ultrasonic sensor.

12. The vehicle of claim 10, wherein the autonomy unit is configured to autonomously perform the defensive driving maneuver for an advanced driver-assistance system (ADAS).

13. The vehicle of claim 10, wherein the defensive driving maneuver performed by the autonomy unit includes at least one of decelerating, emergency braking, changing lanes, and changing a position within a current lane.

14. The vehicle of claim 10, wherein the controller is configured to determine the collision probability further based on a time-to-collision of the adjacent vehicle.

15. The vehicle of claim 14, wherein the controller is configured to determine the time-to-collision based on at least one of a velocity, an acceleration, a direction-of-travel, a distance to an object, a required steering angle to avoid the object, and a steering angle rate-of-change of the adjacent vehicle.

16. The vehicle of claim 10, wherein the controller is configured to determine the collision probability further based on a takeover time that corresponds with a time duration between a request for manual takeover and a predicted manual takeover action by a vehicle operator.

17. The vehicle of claim 16, wherein the controller is configured to determine the takeover time based on measured characteristics of at least one of the adjacent vehicle, the vehicle operator, and an environment.

18. A vehicle comprising:
    a communication module configured to perform vehicle-to-vehicle (V2V) communication with an adjacent vehicle;
    range-detection sensors configured to detect lane markers;
    a controller configured to:
        detect lane-marker locations via the range-detection sensors;
        collect lane-marker locations via the V2V communication;
        determine a collision probability by comparing the detected lane-marker locations and the collected lane-marker locations based on a takeover time that corresponds with a time duration between a request for manual takeover and a predicted manual takeover action by a vehicle operator; and compare the collision probability to a first threshold; and an autonomy unit to autonomously perform a defensive driving maneuver responsive to the controller determining that the collision probability is greater than the first threshold.

* * * * *